United States Patent
Gao et al.

(10) Patent No.: US 9,401,162 B1
(45) Date of Patent: Jul. 26, 2016

(54) READ SENSOR WITH FREE LAYERS OF DIFFERENT WIDTHS SANDWICHING A SAF STRUCTURE FOR EXTREMELY HIGH RESOLUTION

(71) Applicant: Seagate Technology LLC, Cupertino, CA (US)

(72) Inventors: Kaizhong Gao, North Oaks, MN (US); Wenzhong Zhu, Apple Valley, MN (US); Edward Gage, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/826,779

(22) Filed: Aug. 14, 2015

(51) Int. Cl.
*G11B 5/39* (2006.01)
*G11B 5/09* (2006.01)
*G11B 5/60* (2006.01)

(52) U.S. Cl.
CPC .............. *G11B 5/09* (2013.01); *G11B 5/3906* (2013.01); *G11B 5/3932* (2013.01); *G11B 5/3948* (2013.01); *G11B 5/3958* (2013.01); *G11B 5/6005* (2013.01)

(58) Field of Classification Search
CPC ... G11B 5/3932; G11B 5/3948; G11B 5/3958
USPC ..................... 360/314, 316, 324.12
See application file for complete search history.

(56) References Cited

U.S. PATENT DOCUMENTS

| 7,298,595 | B2 * | 11/2007 | Gill | B82Y 10/00 360/314 |
|---|---|---|---|---|
| 7,630,177 | B2 | 12/2009 | Beach et al. | |
| 7,697,242 | B2 * | 4/2010 | Gill | B82Y 10/00 360/314 |
| 7,751,156 | B2 | 7/2010 | Mauri et al. | |
| 8,164,863 | B2 | 4/2012 | Lin | |
| 8,289,663 | B2 | 10/2012 | Zhang et al. | |
| 8,331,063 | B2 | 12/2012 | Hara et al. | |
| 8,824,106 | B1 | 9/2014 | Garfunkel et al. | |
| 8,922,953 | B1 | 12/2014 | Childress | |
| 8,988,812 | B1 | 3/2015 | Brunnett et al. | |
| 9,040,178 | B2 | 5/2015 | Zhao et al. | |
| 9,099,125 | B1 * | 8/2015 | Hattori | G11B 5/3912 |
| 2004/0057162 | A1 * | 3/2004 | Gill | B82Y 10/00 360/314 |
| 2007/0188942 | A1 | 8/2007 | Beach et al. | |
| 2009/0109580 | A1 * | 4/2009 | Ayukawa | B82Y 10/00 360/324.12 |
| 2009/0316309 | A1 * | 12/2009 | Partee | G11B 5/3958 360/324.2 |
| 2012/0206830 | A1 | 8/2012 | Gao et al. | |
| 2013/0003228 | A1 | 1/2013 | Sapozhnikov | |
| 2013/0161770 | A1 * | 6/2013 | Meng | H01L 43/02 257/421 |
| 2013/0314816 | A1 | 11/2013 | Gao et al. | |
| 2014/0268428 | A1 * | 9/2014 | Dimitrov | G11B 5/3912 360/313 |

* cited by examiner

*Primary Examiner* — Jefferson Evans
(74) *Attorney, Agent, or Firm* — Alan G. Rego; Westman, Champlin & Koehler, P.A.

(57) ABSTRACT

A read sensor that includes an air bearing surface and a synthetic antiferromagnetic (SAF) structure. The read sensor also includes a first free layer (FL) above the SAF structure and a second FL below the SAF structure. The first FL and the second FL have differing widths at the bearing surface. The first FL, the second FL and the SAF structure are configured to provide a reader resolution that corresponds to a difference between a first width of the first FL and a second width of the second FL.

20 Claims, 8 Drawing Sheets

READ SENSOR WITH FREE LAYERS OF DIFFERENT WIDTHS SANDWICHING A SAF STRUCTURE FOR EXTREMELY HIGH RESOLUTION

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

With ever-increasing levels of recording density in disc drives and a need for faster data transfer speeds, the read transducer needs to have correspondingly better data-reproducing capabilities. However, many read transducer designs are such that the read transducers have to be scaled to substantially fit the dimensions of narrow data tracks in disc drives having a high recording density. Electronic and/or magnetic noise may increase with a reduction in read transducer size/volume to fit the dimensions of the narrow data tracks.

SUMMARY

The present disclosure provides reader embodiments in which an overall size/volume of the reader is not directly dependent upon the dimensions of, or the spacing between, data tracks. In one embodiment, a read sensor includes a bearing surface and a synthetic antiferromagnetic (SAF) structure. The read sensor also includes a first free layer (FL) above the SAF structure and a second FL below the SAF structure. The first FL and the second FL have differing widths at the bearing surface. The first FL, the second FL and the SAF structure are configured to provide a reader resolution that corresponds to a difference between a first width of the first FL and a second width of the second FL.

Other features and benefits that characterize embodiments of the disclosure will be apparent upon reading the following detailed description and review of the associated drawings.

DETAILED DESCRIPTION OF ILLUSTRATIVE EMBODIMENTS

Magnetic reproducing device embodiments described below have an overall size/volume that is not directly dependent upon the dimensions of, or the spacing between, data tracks on a data storage medium with which the reproducing device or reader interacts. However, prior to providing additional details regarding the different embodiments, a description of an illustrative operating environment is provided below.

Figure 1:
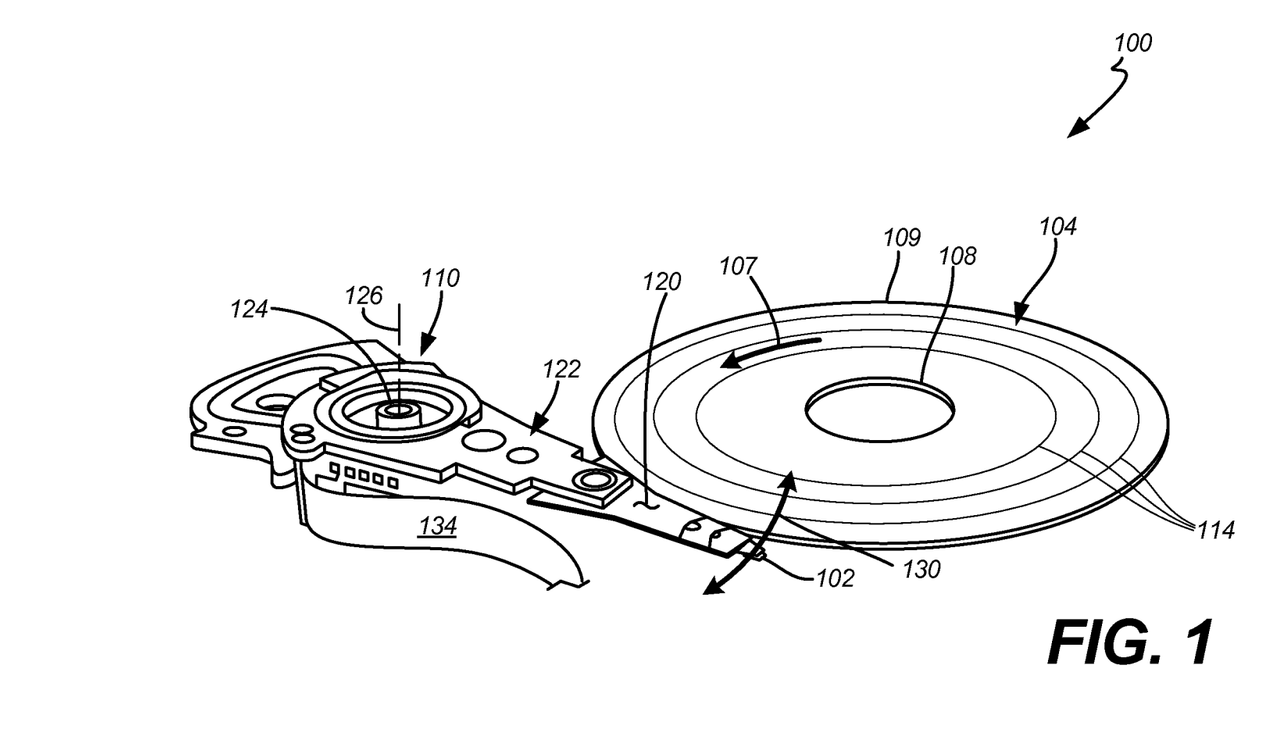
FIG. 1 is a schematic illustration of a data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor (not shown) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry (not shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry (not shown) through flex circuit 134. Details regarding elements of a head such as 102 are provided below in connection with FIG. 2.

Figure 2:
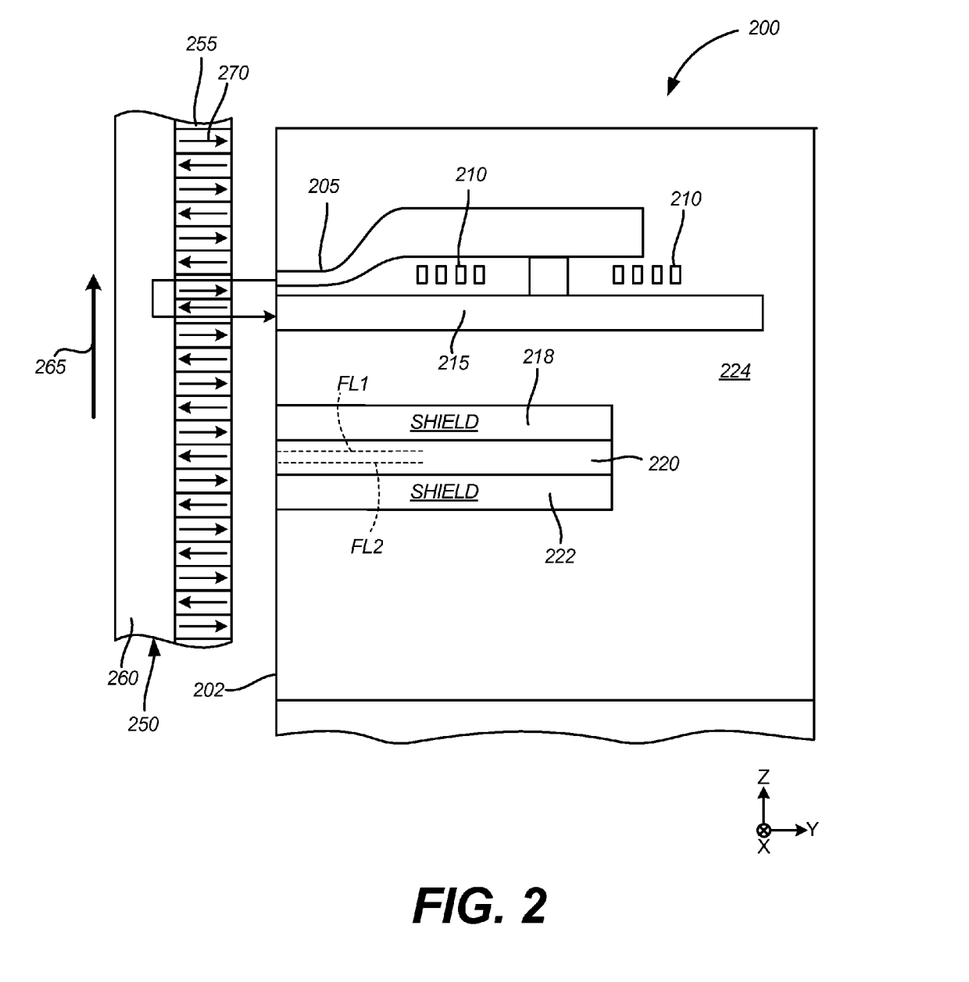
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

Figure 3A:
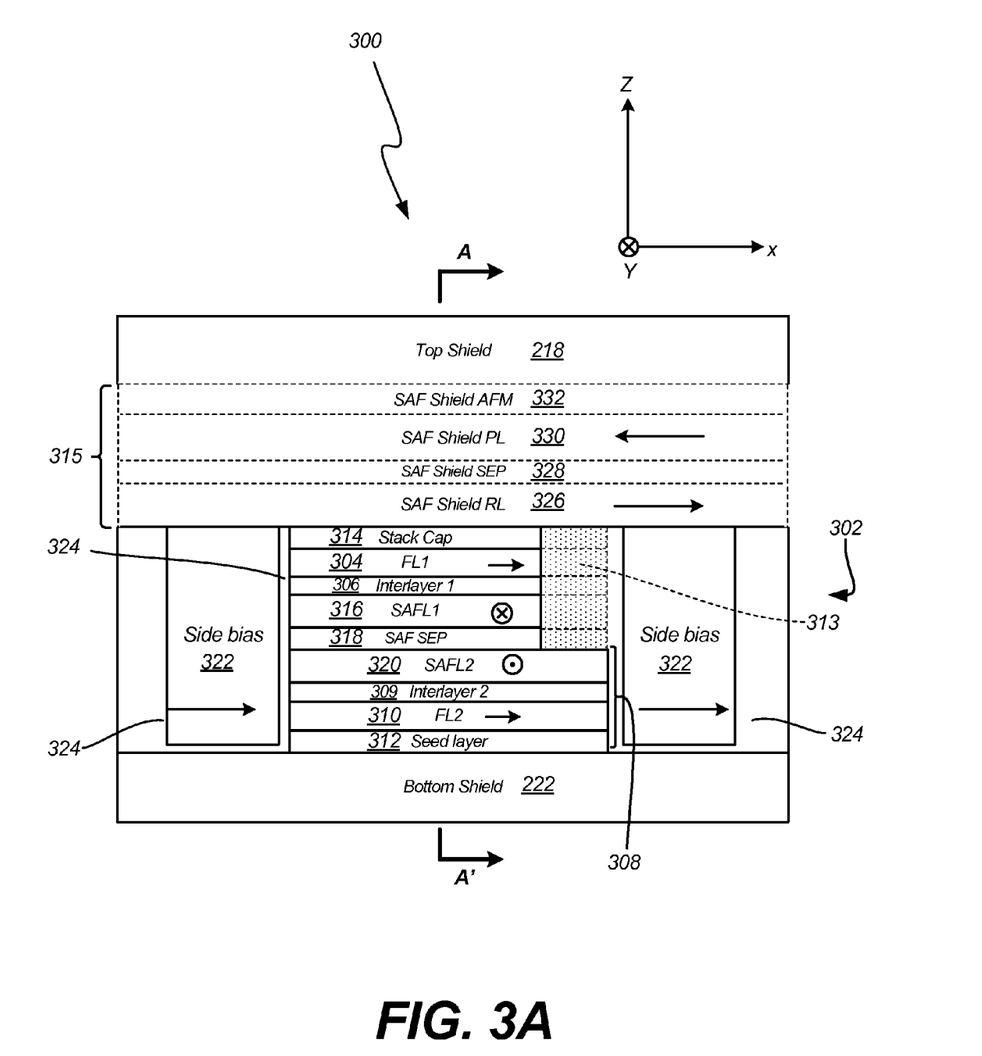
FIG. 3A is a bearing surface view of a magnetic reproducing device including a read sensor having multiple free layers of differing widths at the bearing surface.
Figure 3B:
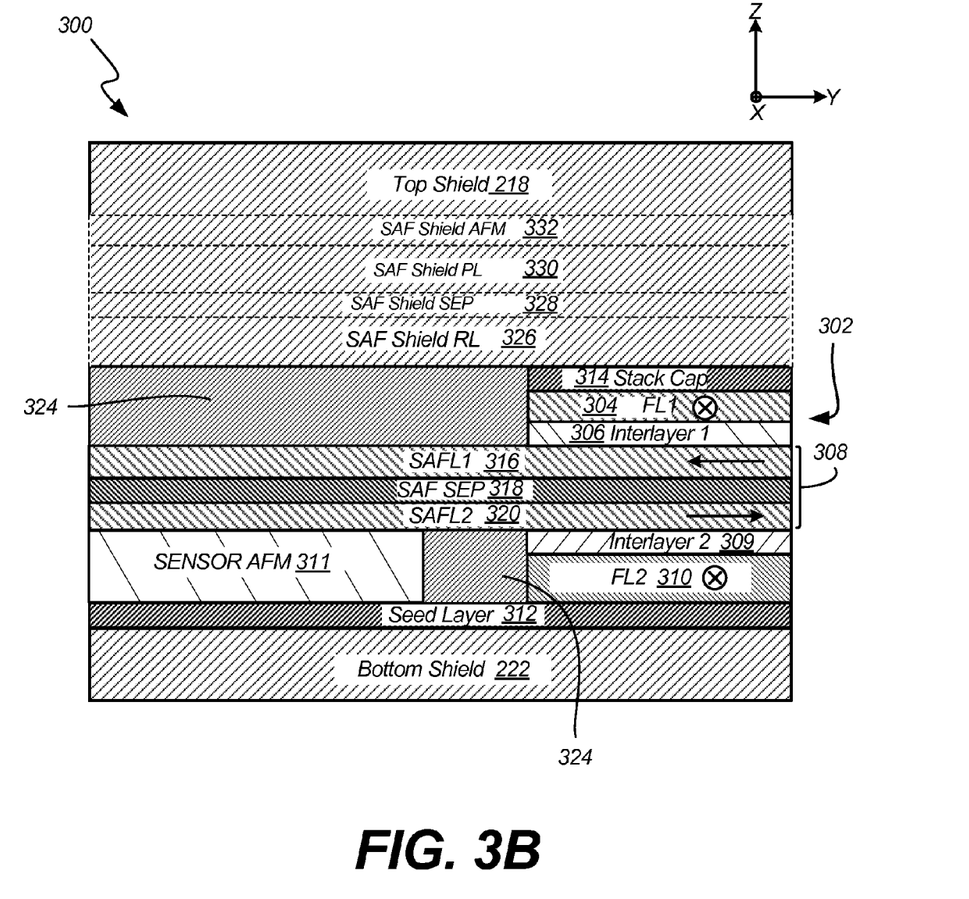
FIG. 3B is a sectional view of the magnetic reproducing device of FIG. 3A.

To address the earlier-noted challenges, read transducer 220 includes multiple sensing layers or free layers 226 and 228. As will be described further below, the free layers 226 and 228 have differing widths at the bearing surface 202, and are configured to provide a reader resolution that corresponds to a difference between a first width of the first free layer 226 and a second width of the second free layer 228. The first and second widths of respective free layers 226 and 228 may be substantially independent of a width of a track and/or a spacing between adjacent tracks. Accordingly, an overall size/volume of the read transducer 220 is not directly dependent upon the dimensions of, or the spacing between, data tracks. It is also contemplated that, in some embodiments, more than two free layers having differing widths may be utilized. In the reader embodiments, free layers 226 and 228 may be stacked along a track direction (i.e., a z-direction in FIG. 2) or a track width direction that is perpendicular to the track direction (i.e., a cross-track direction, which is an x-direction in FIG. 2). A y-direction in FIG. 2 is then defined as a direction that is perpendicular to x and z simultaneously, which is a stripe-height direction. In the embodiment show in FIG. 2, free layers 226 and 228 are stacked along the track direction. A bearing surface view of one reader embodiment is described below in connection with FIG. 3A, and a sectional view of that reader embodiment is shown in FIG. 3B. Thereafter, a principle of operation of the reader of FIGS. 3A and 3B is described further below in connection with FIGS. 4A-4D. Additional reader embodiments are then described in connection with FIGS. 5A and 5B.

FIG. 3A is a schematic block diagram illustrating an example read head 300 including a magnetoresistive sensor 302 having multiple free layers of differing widths. The magnetoresistive sensor 302 is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a first free layer (FL1) 304, a first interlayer 306, a synthetic ferromagnetic (SAF) structure 308, a second interlayer 309 and a second free layer (FL2) 310. Magnetoresistive sensor 302 may also include a seed layer 312 between the bottom shield 222 and the second free layer 310 and a cap layer 314 above the first free layer 304. A SAF shielding structure 315 may optionally be included above the cap layer 314. Dashed lines are used to represent elements within structure 315 to indicate that structure 315 is optional.

In the embodiment shown in FIG. 3A, the sensor SAF structure 308 includes a first ferromagnetic layer (SAFL1) 316, a thin separation layer 318, which may comprise a metal such as ruthenium (Ru) in some embodiments, and a second ferromagnetic layer (SAFL2) 320. The magnetic moments of each of SAFL1 316 and SAFL2 320 are not allowed to rotate under magnetic fields in the range of interest (for example, magnetic fields generated by the bits of data stored on the data discs). The magnetic moments of SAFL1 316 and SAFL2 320 are generally oriented normal to the plane (i.e., the y direction) of FIG. 3A and anti-parallel to each other. In some embodiments, sensor SAF structure 308 is stabilized using an antiferromagnetic (AFM) layer, which may be recessed behind the bearing surface. This is shown in FIG. 3B, which is a cross-sectional view of read head 300 of FIG. 3A through a plane orthogonal to the bearing surface and the layers of the reader stack (along line A-A' shown in FIG. 3A). In FIG. 3B, a recessed sensor AFM layer 311 is positioned below SAFL2 320 and recessed from the bearing surface 202. In reader 300, the unidirectional anisotropy due to the AFM layer 311 helps ensure that the polarity of the SAF (i.e., the magnetic orientations of SAFL1 316 and SAFL2 320 at zero external field) is suitably maintained. The recessed sensor AFM layer 311 may be formed using any suitable deposition technique. It should be noted that, in different embodiments, the recessed sensor AFM layer 311 may be in locations other than that shown in FIG. 3B as long as the recessed sensor AFM layer 311 is able to provide magnetic coupling to the SAF shielding structure 308. For example, recessed AFM layer 311 may be located above, and in contact with, SAFL1 316. In such an embodiment, insulator 324 above SAFL1 316 will be reduced in size to accommodate the recessed AFM layer 311. In certain embodiments, a recessed AFM layer above SAFL1 316 may be in addition to the recessed AFM 311 shown in contact with SAFL2 320 in FIG. 3B. It should also be noted that, in some embodiments, the AFM layer such as 311 may be eliminated. To allow for the elimination of the AFM layer such as 311, the pinning or stabilization functionality provided by the AFM layer has to be achieved/provided using a different technique. One different technique for stabilizing SAF shielding structure 308 is by uniaxial anisotropy induced by shape (for example, by employing different width and height dimensions for SAF 308). It should be noted that techniques other than shape anisotropy may be utilized to provide stabilization (i.e., self-pinning) in a SAF shielding structure such as 308. The techniques include film growth with a suitable aligning magnet and/or deposition of the film(s) at a controlled angle of incidence, suitable thermal annealing processes, etc.

Referring back to FIG. 3A, in one implementation, the first free layer 304 and the second free layer 310 are not exchange coupled to, for example, antiferromagnets. As a result, the magnetic moment of the first free layer 304 and the second free layer 310 are free to rotate under the influence of an applied magnetic field in a range of interest. The read head 300 may further include side biasing magnets or side shields 322, which produce a magnetic field that biases the first free layer 304 and the second free layer 310 with a magnetic moment parallel to the plane of the figure and generally oriented horizontally. This bias prevents the magnetic moment of the first free layer 304 and the second free layer 310 from drifting due to, for example, thermal energy, which may introduce noise into the data sensed by the read head 300. The bias is sufficiently small, however, that the magnetic moments of the first free layer 304 and the second free layer 310 can change in response to an applied magnetic field, such as a magnetic field of a data bit stored on the data discs. In some embodiments, the side biasing magnets or side shields 332 are formed of soft magnetic material (i.e., material that can be easily magnetized and demagnetized at relatively low magnetic fields). The soft magnetic material may be an alloy comprising Ni and Fe. The magnetoresistive sensor 302 is separated and electrically isolated from the side biasing magnets 322 by an isolation layer 324 including, for example, insulating materials. Isolation layer 324 may also be present in other regions of head 300 as shown in FIG. 3A.

In the embodiment shown in FIG. 3A, optional SAF shielding structure 315 includes a SAF shield reference layer 326, a thin SAF shield separation layer 328, which may comprise a metal such as Ru in some embodiments, a SAF shield pinned layer 330 and a SAF shield AFM layer 332. Because, in some embodiments, sensor 300 utilizes soft side shields 322, SAF shield reference layer 326 needs to have a relatively fixed magnetization to assist in stabilizing the magnetizations of side shields 322. Thus, AFM layer 332 needs to pin the magnetization of layer SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 332 substantially parallel to the bearing surface as well. SAF shield reference layer 326 and SAF shield pinned layer 330 may be formed of a soft magnetic material (for example, an alloy comprising Ni and Fe). It should be noted that, instead of employing SAF shielding structure 315, side shields 332 may be stabilized by shape anisotropy, by employing hard magnetic layers adjacent to the soft magnetic layers within side shield 332, or by any other suitable technique.

In some embodiments, sensor 302 may utilize tunnel magnetoresistance (TMR) or giant magnetoresistance (GMR) effects. In the embodiments that utilize GMR effects, first interlayer 306 and second interlayer 309 are metallic layers. One or both interlayers 306 and 309 may comprise Cu or one or more Heusler alloys comprising at least one of Cu, Co, Mn, Ge, Ga, Fe, Si, Cr, Ag, Ti, Al, Sn, Mg, V, B, Pd, N, Ni or Pt. Further, one or both interlayers 306 and 309 may be multi-layered structures. Examples of alloys (or combinations of alloys) that may be used to form single interlayers or different layers of the multilayered interlayer structures include: 1) $Cu_2MnAl$, $Cu_2MnIn$, $Cu_2MnSn$, $MnBi$; 2) $Ni_2MnAl$, $Ni_2MnIn$, $Ni_2MnSn$, $Ni_2MnSb$, $Ni_2MnGa$; 3) $Co_2MnAl$, $Co_2MnSi$, $Co_2MnGa$, $Co_2MnGe$; 4) $Pd_2MnAl$, $Pd_2MnIn$, $Pd_2MnSn$, $Pd_2MnSb$; 5) $Co_2FeSi$, $Co_2FeAl$; 6) $Fe_2Val$; and 7) $Mn_2VGa$, $Co_2FeGe$. In the embodiments that utilize TMR effects, first interlayer 306 and second interlayer 309 are tunneling barrier layers that may comprise MgO, for example. In such embodiments, each of the first barrier layer 306 and the second barrier layer 309 is sufficiently thin that quantum mechanical electron tunneling occurs between SAFL1 316 and first free layer 304 and between SAFL2 320 and second free layer 310. The electron tunneling is electron-spin dependent, making the magnetic response of the magnetoresistive sensor 302 a function of the relative orientations and spin polarizations of SAFL1 316 and first free layer 304 and SAFL2 320 and second free layer 310. Additionally, in magnetoresistive sensor 320, different sensing layers have different widths to impact an overall resolution of sensor 320. Specifically, magnetoresistive sensor 320 is formed such that first free layer 304, first interlayer 306 and SAFL1 316 have a first width that is different from a second width of second free layer 310, second interlayer 309 and SAFL2 320. The different widths may be achieved by employing a suitable milling process or by an ion deposition technique. In FIG. 3A, region 313, which includes dashed and dotted lines, is where a process such as milling or ion deposition is carried out for width reduction or destruction of magnetic moments. It should be noted that the width reduction can be carried out in any suitable location in different embodiments. Also, region 313 is shown to extend from a top of stack cap 314 to a bottom of SAF separation layer 318 in FIG. 3A. However, in different embodiments, region 313 may extend from cap 314 to any suitable depth (for example, only to the bottom of layer 304 (or top of layer 306), all the way down to the bottom of interlayer 309 (or top of layer 310), or anywhere in between). A resolution of reader 300 corresponds to a difference between the first and second widths of the elements of sensor 320. This is explained below in connection with FIGS. 4A-4D.

Figure 4A:
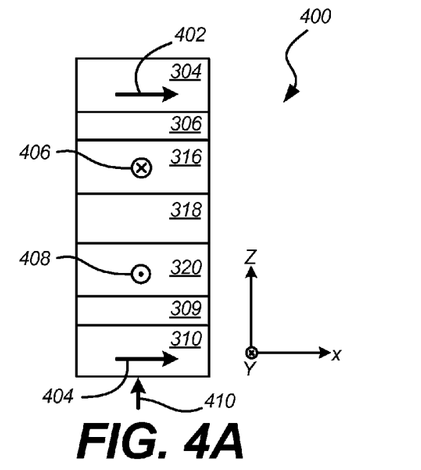
FIG. 4A-4D are diagrammatic illustrations that collectively illustrate a principle of operation of the magnetic reproducing device of FIGS. 3A and 3B.
Figure 4B:
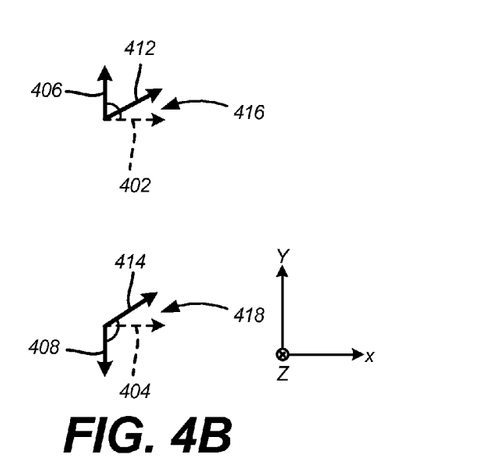
Figure 4C:
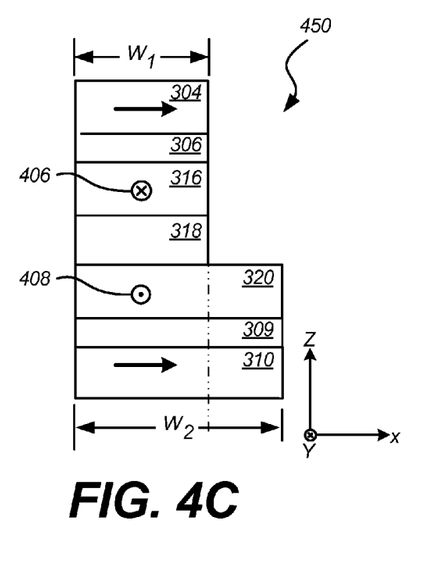
Figure 4D:
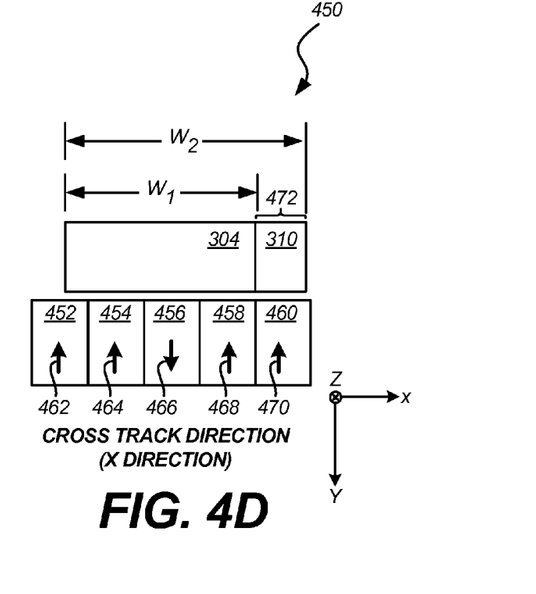

FIG. 4A is a schematic illustration showing a bearing surface view a sensor stack 400 in which multiple sensing elements of a same width are employed. As can be seen in FIG. 4A, first free layer 304 and second free layer 310 are magnetized in a same horizontal direction indicated by arrows 402 and 404, respectively. The magnetic moments of SAFL1 316 and SAFL2 320 are oriented normal to the plane (i.e., the y direction) of FIG. 4A and anti-parallel to each other. The magnetization directions of SAFL1 316 and SAFL2 320 are denoted by reference numerals 406 and 408, respectively. Arrow 410 denotes an external magnetic field (for example, form a magnetized bit on a data storage medium) that is vertical and in an upward direction. As noted above, the magnetic moment of the first free layer 304 and the second free layer 310 are free to rotate under the influence of an applied magnetic field in a range of interest. Also, as noted above, the magnetic moments of each of SAFL1 316 and SAFL2 320 are not allowed to rotate under magnetic fields in the range of interest. Thus, when the external field denoted by arrow 410 acts on sensor 400, changes in magnetization directions of first free layer 304 and second free layer 310 take place in a manner shown in FIG. 4B, which is a top-down view of the different magnetization directions of layers within sensor stack 400. In FIG. 4B, the dashed arrows represent the horizontal magnetization directions 402 and 404 of the first free layer 304 and second free layer 310, respectively, when those layers are not under the influence of external field 410. Solid arrows 412 and 414 represent the magnetization directions of first free layer 304 and second free layer 310, respectively, when their magnetizations are rotated under the influence of external field 410 (i.e., 412 is 402 in a rotated state and 414 is 404 in a rotated state). As can be seen in FIG. 4B, angle 416 represents a decrease in an angle between arrows 402 and 406 as a result of external field 410, and angle 418 represents an increase in an angle between arrows 404 and 408 as a result of external field 410. Since angles 416 and 418 are substantially equal and in opposite directions relative to the magnetization directions 406 and 408, respectively, the response of one of the free layer 304 and 310 is cancelled by the response of the other one of free layers 304 or 310. However, it is found that, if one of the free layers 304 and 310 is wider that the other one of the free layers 304 and 310 at the bearing surface, then the overall response of the sensor corresponds to a difference between the widths of the respective free layers. This is illustrated in FIG. 4C, which shows a bearing surface view of a sensor 450 in which a first width ($W_1$) of the first free layer 304 is less than a second width ($W_2$) of the second free layer 310. The response of sensor 450 corresponds to a difference between $W_1$ and $W_2$. FIG. 4D illustrates how a sensor such as 450 senses bits on tracks of a data storage medium. In FIG. 4D, bits on 5 adjacent tracks (452, 454, 456, 458 and 460) are schematically shown in a cross-track direction (i.e., the x direction). If a track pitch or track width of each of tracks 452, 454, 456, 458 and 460 is about 20 nanometers (nm), then a sensor that is capable of separately reading a bit such as 462, 464, 466, 468 or 470 needs to have a resolution that corresponds to the 20 nm track pitch. As can be seen in FIG. 4D, although sensor 450 is substantially wider than 20 nanometers, portions of sensor 450 where there is an overlap between $W_1$ and $W_2$ produces no read response and only non-overlapping portion 472 provides the response of reader 450. In other words, signals sensed by reader 450 from bits 462, 464, 466 and 468 are cancelled within reader 450, thereby providing a sensed output for only bit 470. Thus, sensor 450 can have an overall size/volume that is not directly dependent upon the dimensions of, or the spacing between, data tracks on a data storage medium with which read sensor 450 interacts.

In the embodiments described above, both the first free layer 304 and the second free layer 310 are substantially continuous layers. However, in some embodiments at least one of the first free layer 304 or the second free layer 310 may be split into multiple segments.

Figure 5A:
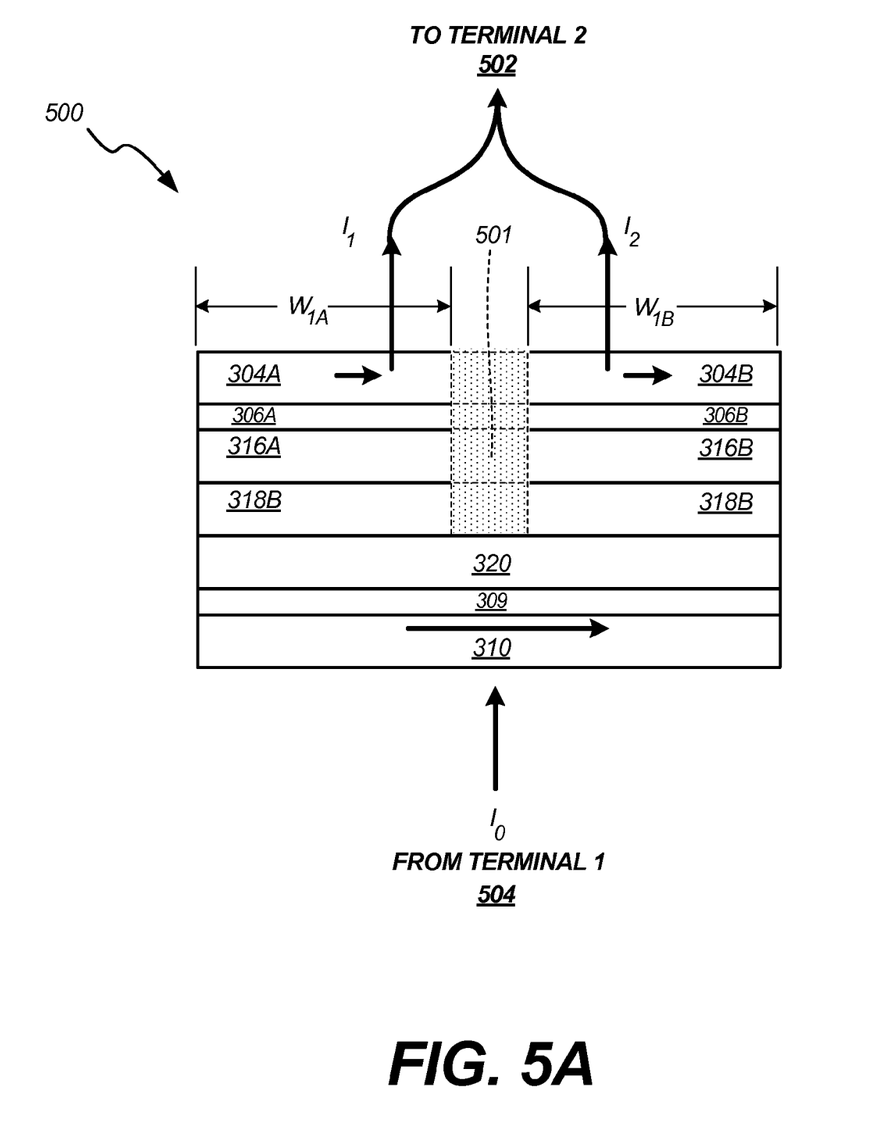
FIGS. 5A and 5B are bearing surface views of a magnetic reproducing device in accordance with another embodiment.
Figure 5B:
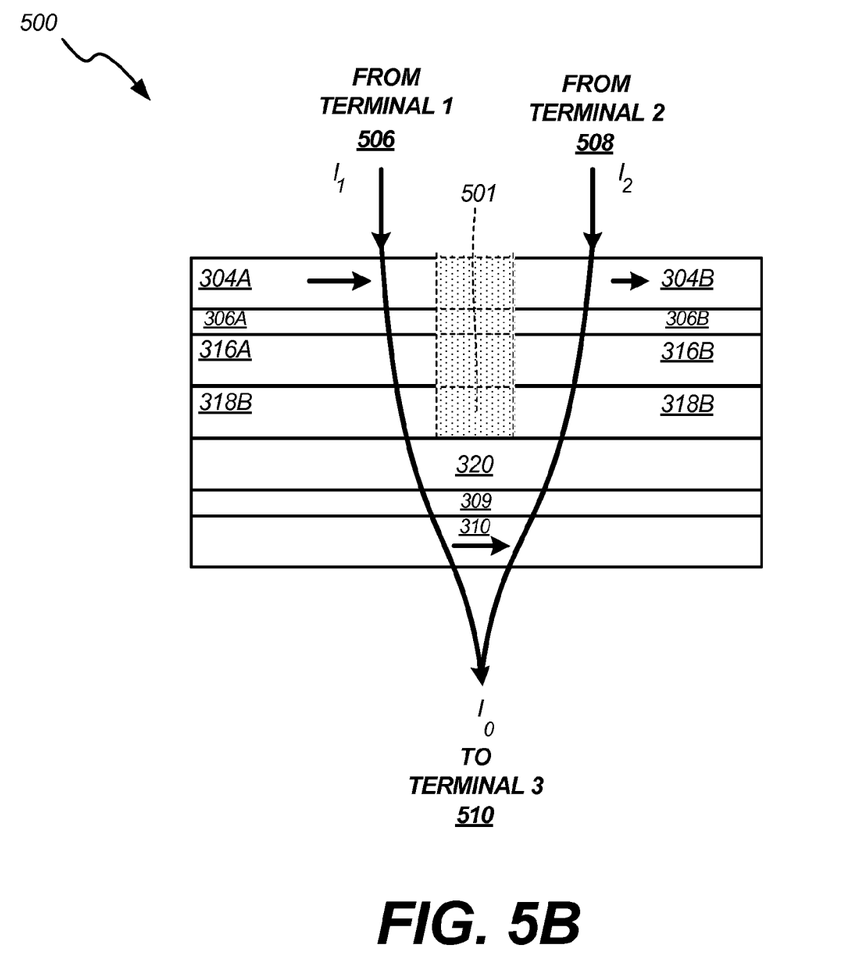

FIGS. 5A and 5B are bearing surface views of sensor 500 that show the first free layer split into multiple segments. Specifically, in sensor 500, the first free layer is split into two separate segments 304A and 304B. The splitting of the first free layer into the first segment 304A and the second segment 304B is carried out using any suitable technique (for example, by a suitable milling process or by an ion deposition technique). As shown in FIGS. 5A and 5B, other layers of sensor 500 may be split into first and second segments. For example, the first interlayer may be split into segments 316A and 316B, SAFL1 may be split into segments 316A and 316B and the separation layer may be separated into segments 318A and 318B. In the embodiment of FIGS. 5A and 5B, region 501, which includes dashed and dotted lines, is where a process such as milling or ion deposition is carried out for width reduction by splitting. Region 501 is shown to extend from a top of layer 304A, 304B to a bottom of SAF separation layer 318A, 318B, in FIGS. 5A and 5B. However, in different embodiments, region 510 may extend from the top layer 304A, 304B (or from the top of a stack cap such as 314 (not shown in FIGS. 5A and 5B) to any suitable depth (for example, only to the bottom of layer 304A, 304B (or top of layer 306A, 306B), all the way down to the bottom of interlayer 309 (or top of layer 310), or anywhere in between). As can be seen in FIG. 5A, segment 304A has a width $W_{1A}$ and segment 304B has a width $W_{1B}$, which may be equal to, or different from, $W_{1A}$ in different embodiments. Also, as can be seen in FIG. 5A, a sum of widths $W_{1A}$ and $W_{1B}$ is less than width $W_2$. In the embodiment of FIG. 5A, both segments 304A and 304B are electrically coupled to a same reader terminal (Terminal 2) 502 and the second free layer 310 is electrically coupled to a single reader terminal (Terminal 1) 504, thereby forming a two-terminal reader. In the two-terminal reader of FIG. 5A, current $I_0$ is showing entering sensor 500 through the second free layer 310 and splitting into components $I_1$ and $I_2$, which are joined at terminal 502. In FIG. 5B, first segment 304A is electrically coupled to a first reader terminal (Terminal 1) 506, second segment 304B is coupled to a second reader terminal (Terminal 2) 508 and the second free layer 310 is coupled to a third reader terminal (Terminal 3) 510, thereby form a three-terminal reader. In the three-terminal reader, currents $I_1$ and $I_2$ are shown entering segments 304A and 304B from respective reader terminals 506 and 508. Currents $I_1$ and $I_2$ are joined at reader terminal 510 to provide a combined current $I_0$.

Since, in the above-described embodiments, the first free layer 304 interacts with a data storage medium to provide a first sensed signal and the second free layer 310 interacts with the data storage medium to provide a second sensed signal, a two-dimensional read signal is obtained in the read sensor. As described above, an interaction between the first sensed signal and the second sensed signal takes place within the reader, and a final out signal is provided. In contrast, in conventional two-dimensional readers, two separate sensed signals are obtained from two separate read sensors, which may be electrically isolated from each other, and the separate sensed signals are combined using circuitry connected externally to the individual sensors. Thus, embodiments of the present disclosure provide a two-dimensional sensor that inherently (i.e., without circuitry external to the sensor) produces a two-dimensional sensed signal and resolves the two sensed signal components within the sensor to provide a sensor output.

Figure 6:
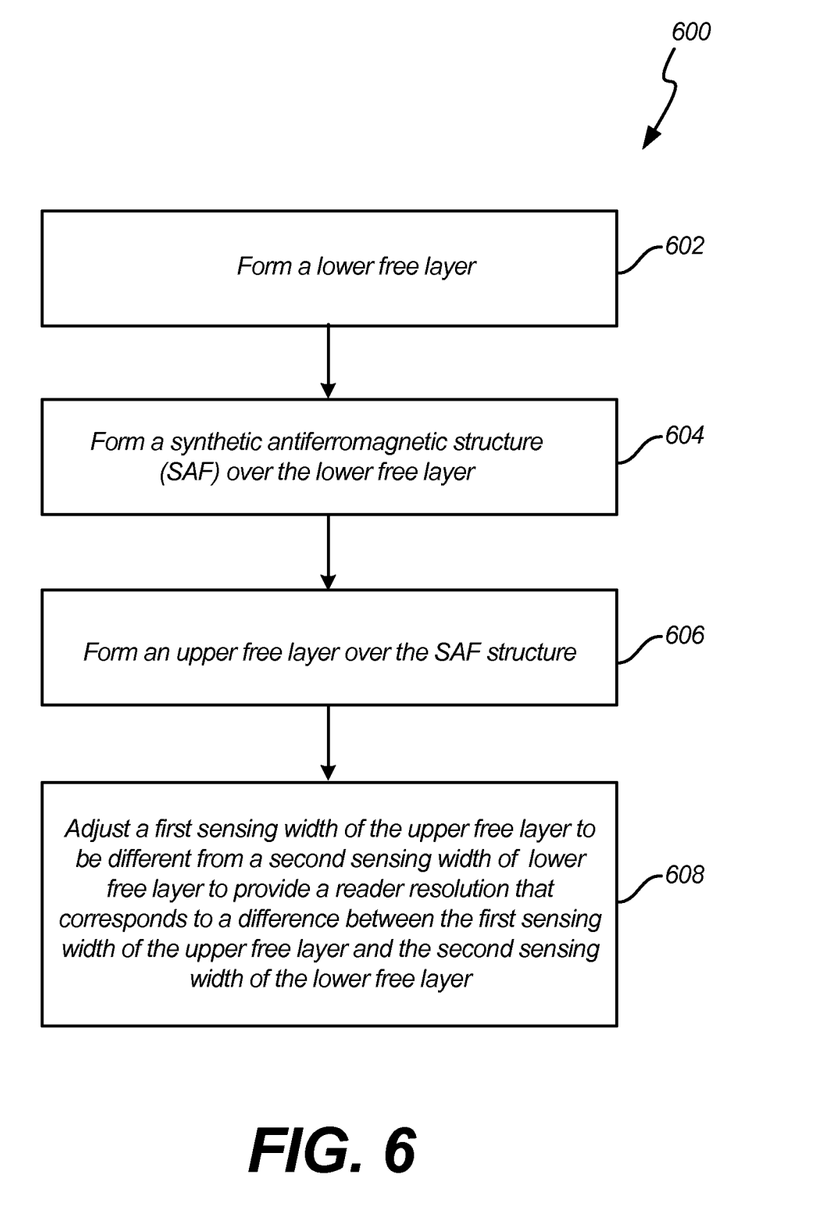
FIG. 6 is a simplified flow diagram of a method embodiment.

FIG. 6 shows a simplified flow diagram 600 of a method of forming a read sensor in accordance with one embodiment. At step 602, a second or lower free layer is formed. At step 604, a synthetic antiferromagnetic (SAF) structure is formed over the lower free layer. This is followed by step 606 at which an upper or first free layer is formed over the SAF structure. At step 608, a first sensing width of the first or upper free layer is adjusted to be different from a second sensing width of the second or lower free layer to provide a reader resolution that corresponds to a difference between the first sensing width of the first or upper free layer and the second sensing width of the second or lower free layer. It should be noted that the read sensor may include several additional layers formed between, above and/or below the layers formed in steps 602, 604 and 606.

Although various examples of multiple free layers with differing widths within magnetic reproducing devices are disclosed in the application, embodiments are not limited to the particular applications or uses disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the magnetic reproducing device with the multiple free layers of differing widths while maintaining substantially the same functionality without departing from the scope and spirit of the present disclosure. In addition, although the embodiments described herein are directed to a particular type of magnetic reproducing device utilized in a particular data storage system, it will be appreciated by those skilled in the art that the teachings of the present disclosure can be applied to other data storage devices without departing from the scope and spirit of the present disclosure.

What is claimed is:
1. A read sensor comprising:
a bearing surface;
a synthetic antiferromagnetic (SAF) structure;
a first free layer (FL) above the SAF structure; and
a second FL below the SAF structure;

wherein the first FL and the second FL have differing widths at the bearing surface, and wherein the first FL, the second FL and the SAF structure are configured to provide a reader resolution that corresponds to a difference between a first width of the first FL and a second width of the second FL.

2. The read sensor of claim 1 and wherein the SAF structure comprises a first ferromagnetic layer that is adjacent to a first interlayer that separates the first FL from the SAF structure and a second ferromagnetic layer that is adjacent to a second interlayer that separates the second FL from the SAF structure.

3. The read sensor of claim 2 and wherein a width of the first ferromagnetic layer of the SAF structure corresponds to the first width of the first FL and wherein a width of the second ferromagnetic layer corresponds to the second width of the second FL.

4. The read sensor of claim 2 and wherein at least one of the first interlayer or the second interlayer comprises MgO, Cu or one or more Heusler alloys comprising at least one of Cu, Co, Mn, Ge, Ga, Fe, Si, Cr, Ag, Ti, Al, Sn, Mg, V, B, Pd, N, Ni or Pt.

5. The read sensor of claim 4 and wherein the multiple segments comprise a first segment and a second segment, and wherein the first segment and the second segment are electrically coupled to a first reader terminal, and wherein the second FL is electrically coupled to a second reader terminal thereby forming a two-terminal reader.

6. The read sensor of claim 1 and wherein the first width of the first FL is less that a second width of the second FL.

7. The read sensor of claim 6 and wherein the first FL is split into multiple segments that each have a width, and wherein the first width is a sum of the widths of different ones of the multiple segments.

8. The read sensor of claim 7 and wherein the multiple segments comprise a first segment and a second segment, and wherein the first segment is electrically coupled to a first reader terminal and the second segment is electrically coupled to a second reader terminal, and wherein the second FL is electrically coupled to a third reader terminal, thereby forming a three-terminal reader.

9. The read sensor of claim 1 and wherein the first FL interacts with a data storage medium to provide a first sensed signal and the second FL interacts with the data storage medium to provide a second sensed signal, and wherein a combination of the first sensed signal and the second sensed signal is a two-dimensional magnetic recording signal.

10. The read sensor of claim 1 and further comprising an antiferromagnetic (AFM) layer adjacent to the SAF structure and recessed from the bearing surface, wherein the AFM layer is configured to stabilize a magnetization of the SAF structure.

11. A method of forming a read sensor comprising:
forming a lower free layer (FL);
forming a synthetic antiferromagnetic (SAF) structure over the lower FL;
forming an upper FL over the SAF structure; and
adjusting a first sensing width of the lower FL to be different from a second sensing width of the upper FL to provide a reader resolution that corresponds to a difference between the first sensing width of the lower FL and the second sensing width of the upper FL.

12. The method of claim 11 and wherein the adjusting the first sensing width to be different from the second sensing width is carried out by one of a milling process or an ion deposition process.

13. The method of claim 11 and further comprising:
forming an interlayer between the lower FL and the SAF structure; and
forming an interlayer between the upper FL and the SAF structure.

14. The method of claim 11 and further comprising forming an antiferromagnetic (AFM) layer adjacent to the SAF structure and recessed from a bearing surface of the read sensor.

15. The method of claim 11 and further comprising splitting one of the upper FL or the lower FL into multiple segments.

16. The method of claim 15 and further comprising electrically connecting each different one of the multiple segments to a different reader terminal.

17. The method of claim 15 and further comprising electrically connecting all of the multiple segments to a same reader terminal.

18. A read sensor comprising:
a bearing surface;
a synthetic antiferromagnetic (SAF) structure;
a first free layer (FL) split into multiple segments that each comprise a segment width at the bearing surface, wherein the first free layer is positioned above the SAF structure; and
a second FL below the SAF structure;
wherein a sum of the segment widths of different ones of the multiple segments is less than a width of the second FL at the bearing surface, and
wherein the first FL, the second FL and the SAF structure are configured to provide a reader resolution that corresponds to a difference between the sum of the segment widths of the different ones of the multiple segments of the first FL and the width of the second FL.

19. The read sensor of claim 18 and wherein the multiple segments comprise a first segment and a second segment, and wherein the first segment is electrically coupled to a first reader terminal and the second segment is electrically coupled to a second reader terminal, and wherein the second FL is electrically coupled to a third reader terminal thereby forming a three-terminal reader.

20. The read sensor of claim 18 and wherein the multiple segments comprise a first segment and a second segment, and wherein the first segment and the second segment are electrically coupled to a first reader terminal, and wherein the second FL is electrically coupled to a second reader terminal thereby forming a two-terminal reader.

* * * * *